United States Patent
Svingen et al.

(10) Patent No.: US 7,330,857 B1
(45) Date of Patent: Feb. 12, 2008

(54) SEARCH ENGINE WITH TWO-DIMENSIONAL LINEARLY SCALABLE PARALLEL ARCHITECTURE

(75) Inventors: Børge Svingen, Hommelvik (NO); Knut Magne Risvik, Trondheim (NO); Arne Halaas, Trondheim (NO); Tor Egge, Trondheim (NO)

(73) Assignee: Overture Services, Inc., Pasadena, CA (US)

( * ) Notice: Subject to any disclaimer, the term of this patent is extended or adjusted under 35 U.S.C. 154(b) by 0 days.

(21) Appl. No.: 09/743,268

(22) PCT Filed: May 10, 2000

(86) PCT No.: PCT/NO00/00155

§ 371 (c)(1),
(2), (4) Date: Feb. 16, 2001

(87) PCT Pub. No.: WO00/68834

PCT Pub. Date: Nov. 16, 2000

(30) Foreign Application Priority Data

May 10, 1999 (NO) .................................. 19992269

(51) Int. Cl.
*G06F 17/30* (2006.01)
(52) U.S. Cl. ........................... 707/104.1; 707/3; 707/10
(58) Field of Classification Search ............. 707/1–10, 707/101, 102, 104.1; 709/104, 105, 201, 709/202, 217–219, 223, 244, 249, 250, 203, 709/215
See application file for complete search history.

(56) References Cited

U.S. PATENT DOCUMENTS

| | | | | |
|---|---|---|---|---|
| 4,860,201 A | * | 8/1989 | Stolfo et al. ................... | 712/11 |
| 5,388,214 A | * | 2/1995 | Leiserson et al. ............. | 712/15 |
| 5,694,593 A | * | 12/1997 | Baclawski ..................... | 707/5 |
| 5,717,912 A | | 2/1998 | Millett et al. | |
| 5,742,806 A | * | 4/1998 | Reiner et al. .................. | 707/3 |

(Continued)

OTHER PUBLICATIONS

Mak et al., Exploiting Parallelism in Pattern Matching: An Information Retrieval Application, 1991, ACM, pp. 52-74.*

(Continued)

*Primary Examiner*—Leslie Wong
(74) *Attorney, Agent, or Firm*—Seth H. Ostrow; Dreier LLP

(57) ABSTRACT

In a search engine with two-dimensional scalable architecture for searching of a collection of documents, the search engine comprises data processing units which forms set of nodes connected in a network, a first set of nodes comprising dispatch nodes, a second set of nodes search nodes and a third set of nodes indexing nodes. The search nodes are grouped in columns, which via the network are connected in parallel between the dispatch nodes and an indexing node. The dispatch nodes are adapted for processing search queries and search answers, the search nodes are adapted to contain search software, at least some of the search nodes additionally including at least one search processor module and the indexing nodes are adapted for generally generating indexes for the search software. Optionally, acquisition nodes provided in a fourth set of nodes and adapted for processing the search answers, thus relieving the dispatch nodes of this task. The two-dimensional scaling takes place respectively through a scaling of the data volume and a scaling of the search engine performance through a respective adaptation of the architecture.

8 Claims, 6 Drawing Sheets

U.S. PATENT DOCUMENTS

| | | | |
|---|---|---|---|
| 5,878,409 A * | 3/1999 | Baru et al. | 707/2 |
| 5,960,194 A * | 9/1999 | Choy et al. | 707/102 |
| 5,978,791 A * | 11/1999 | Farber et al. | 707/2 |
| 6,026,394 A * | 2/2000 | Tsuchida et al. | 707/3 |
| 6,112,198 A * | 8/2000 | Lohman et al. | 707/3 |
| 6,370,527 B1 * | 4/2002 | Singhal | 707/6 |
| 6,424,970 B1 * | 7/2002 | Arakawa et al. | 707/7 |
| 6,549,519 B1 * | 4/2003 | Michels et al. | 370/238 |
| 6,567,806 B1 * | 5/2003 | Tsuchida et al. | 707/7 |
| 2001/0011268 A1 * | 8/2001 | Tsuchida et al. | 707/2 |

OTHER PUBLICATIONS

Porter, K. J, "Textract-a hardware based parallel text search system", in: Parallel Techniques for Information Retrieval, IEE Colloquium on; May 1, 1989, Accession No. 3429223.

Soroush, Proceedings of the American Control Conference, pp. 1349-1353 (1994).

* cited by examiner

Dispatch Nodes: $N_{\alpha 1} \ldots N_{\alpha a}$
Search Nodes: $N_{\beta 1} \ldots N_{\beta b}$
Group Nodes: $S_{\beta 1} \ldots S_{\beta v}$
Indexing Nodes: $N_{\gamma 1} \ldots N_{\gamma g}$
Acquisition Nodes: $N_{\delta 1} \ldots N_{\delta e}$ Search Nodes: $N_{\beta 1} \ldots N_{\beta b}$
Group Nodes: $S_{\beta 1} \ldots S_{\beta v}$
Search Engine: SW
PMC Module: $M_1 \ldots M_x$

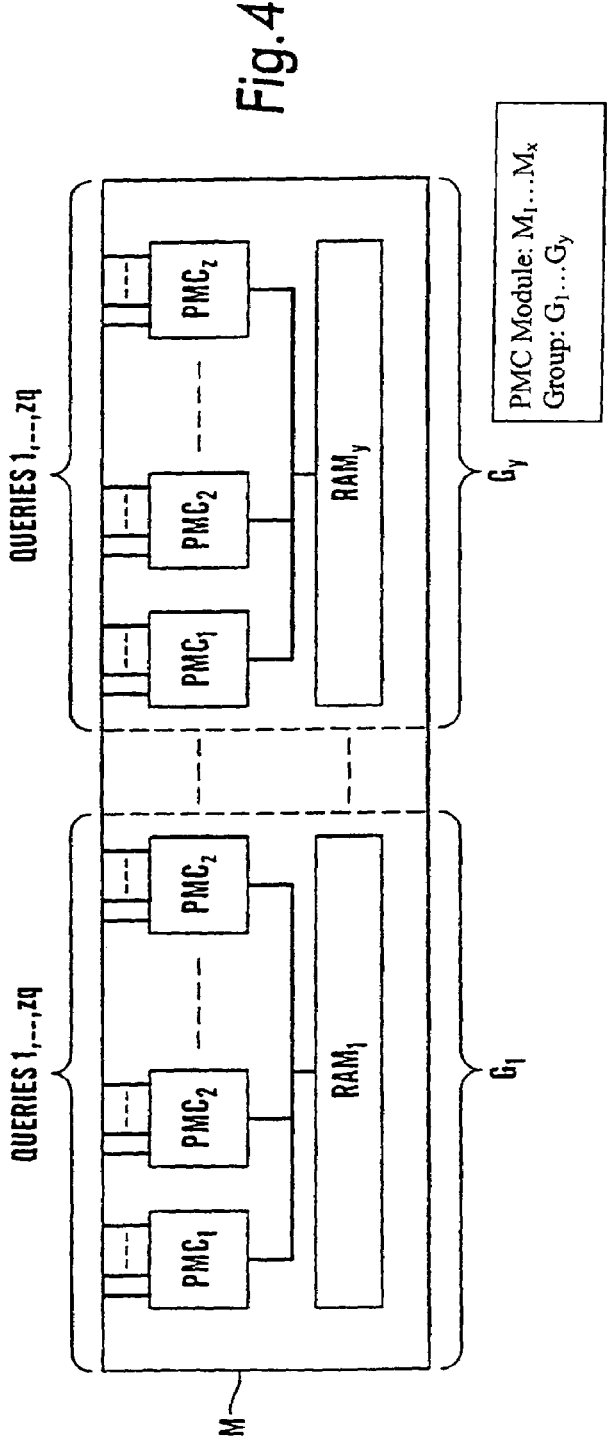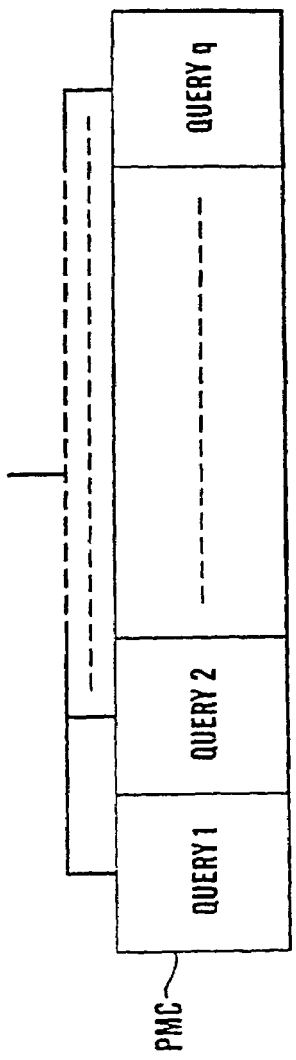

SEARCH ENGINE WITH TWO-DIMENSIONAL LINEARLY SCALABLE PARALLEL ARCHITECTURE

This application is the national phase under 35 U.S.C. § 371 of PCT International Application No. PCT/NO00/00155 which has an International filing date of May 10, 2000, which designated the United States of America.

BACKGROUND OF THE INVENTION

The present invention concerns a search engine with two-dimensional linearly scalable parallel architecture for searching a collection of text documents D, wherein the documents can be divided into a number of partitions $d_1$, $d_2$, ... $d_n$, wherein the collection of documents D is preprocessed in a text filtration system such that a preprocessed document collection $D_p$ is obtained and corresponding preprocessed partitions $d_{p1}$, $d_{p2}$, ... $d_{pn}$, wherein an index I can be generated from the document collection D such that for each previous preprocessed partition $d_{p1}$, $d_{p2}$, ... $d_{pn}$ a corresponding index $i_1$, $i_2$, ... $i_n$ is obtained, wherein searching a partition d of the document collection D takes place with a partition-dependent data set $d_{p,k}$ comprising both the preprocessed partition $d_{pk}$ and the corresponding index $i_k$, with $1 \leq k \leq n$, and wherein the search engine comprises data processing units which form sets of nodes connected in a network.

Most prior art search engines work with large data set and employ powerful computers to perform the search. However, searching is a partitionable data processing problem, and this fact can be used to partition a search problem into a large number of specific queries and let each query be processed simultaneously on a commensurate number of processors connected in parallel in a network. Particularly searching can be regarded as a binary partitionable data processing problem, and hence a binary tree network is used for establishing a multiprocessor architecture such as disclosed for instance in U.S. Pat. No. 4,860,201 (Stolfo & al.) and international patent application PCT/NO99/00308 which belongs to the applicant and hereby is incorporated by reference. The present applicant has developed proprietary technologies for searching within regular text documents. These technologies are i.a. based on a search system and a method for searching as described in international patent application PCT/NO99/00233 which belongs to the applicant and hereby is incorporated by reference. The search system is based on efficient core search algorithms which may be used in the search engine according to the invention.

However, it has become increasingly important to cater for a growing number of documents to be searched and also to be able to handle an increased traffic load, i.e. the number of queries per second which shall be processed by the search system. This, apart from the ability to handle a large number of queries simultaneously on processor level, implies that a search engine should be implemented with an architecture that allows for preferably linear scalability in two dimensions, viz. both with regard to the data volume and the performance, i.e. the ability to handle a very large number of queries per second. Considering the development of the World Wide Web, a scalability problem in the search engine architecture will be extremely important as there presently is an enormous growth rate in both the number of documents and the number of users on the Internet.

Prior art search engine solutions for Internet are able to scale to a certain level, but almost always this is achieved in a manner that requires a high cost increase of the search engine system relative to the growth in data volume or data traffic. Very often the system costs scale as the square of the data volume or the traffic, a doubling of the data volume thus leading to quadrupled system costs. Furthermore all the major Internet search engines presently are based on very expensive server technology, often coupled with brute computing force-approaches and accompanied with disadvantages such as slow server turnaround, requirements for special hardware to provide fault tolerance etc. The system costs can e.g. be measured as the amount of hardware required to implement a search engine solution or the actual aggregated price of the system.

BRIEF SUMMARY OF THE INVENTION

It is thus a main object of the present invention to provide a search engine with a multilevel data and functional parallelism, such that large volumes of data can be searched efficiently and very fast by a large number of users simultaneously.

Particularly it is a further object of the invention to provide a parallel architecture for implementing a search engine with a multilevel data and functional parallelism.

Yet a further object of the present invention is to provide a parallel architecture which is linearly scalable in two dimensions, i.e. with regard to both data volume and performance, that is the query rate.

The above-mentioned objects and further features and advantages are provided with a search engine according to the invention which is characterized in that the first set of nodes comprises a dispatch nodes, a second set of nodes comprises b search nodes, a third set of nodes comprises g indexing nodes, and an optional fourth set of nodes comprises e acquisition nodes, that the dispatch nodes are connected in a multilevel configuration in the network, that the search nodes are grouped in columns which are connected in parallel in the network between the dispatch nodes and an indexing node, that the dispatch nodes are adapted to process search queries and search answers, the search queries being dispatched further to all search nodes and in case the acquisition nodes are not present, the search answers being returned to the dispatch nodes and therein being combined to a final search result, that the search nodes each are adapted to contain search software, that at least some of the search nodes additionally comprise at least one search processor module, that the indexing nodes are adapted for generally generating indexes i for the search software and optionally for generating partition-dependent data sets $d_{p,k}$ to search nodes which comprise a search processor module, that in case acquisition nodes are present, these are connected in a multilevel configuration in the network similar to that of the dispatch node, and adapted for gathering answers to search queries and outputting a final result thereof, thus relieving the dispatch nodes of this task, and that the two-dimensional linear scaling respectively takes place by scaling of the data volume through an increase in the number of partitions d and scaling of performance through replication of one or more partitions d.

According to the invention are advantageously the multilevel configuration of the dispatch nodes and the optional acquisition nodes network provided by hierarchical tree structures, and the multilevel configuration of the optional acquisition nodes is then preferably a mirror image of the multilevel configuration of the dispatch nodes, the hierarchical tree structures preferably being binary tree structures.

According to the invention each of the search nodes advantageously comprises a search software module.

Further, according to the invention at least some of the search nodes comprises at least one dedicated search processor module, each dedicated search processor module being realized with one or more dedicated processor chips, which is adapted for parallel handling of a number of search queries. In this connection it is preferred that the dedicated search processor chips are provided in the search processor modules in y processor groups, each with z search processor chips and being connected with and adapted to receive data from a memory assigned to the processor group.

According to the invention the increase in the number of partitions in the scaling of the data volume is advantageously implemented by an increase in the number of search node groups or columns. In this connection the increase in the number of partitions can preferably be accompanied by a corresponding increase in the number of dispatch nodes and, in case, also in the number of acquisition nodes, and optionally also by an increase in the number of index nodes.

According to the invention the replication of one or more partition in the scaling of performance is advantageously implemented by an increase in the number of search nodes in each group or column.

Finally it is according to the invention advantageous that the separate node sets each is implemented over one or more workstations connected in a data communications network.

BRIEF DESCRIPTION OF THE DRAWINGS

The search engine according to the invention shall now be described in terms of non-limiting exemplary embodiments and with reference to the accompanying drawings, in which.

DETAILED DESCRIPTION OF THE INVENTION

Figure 1:
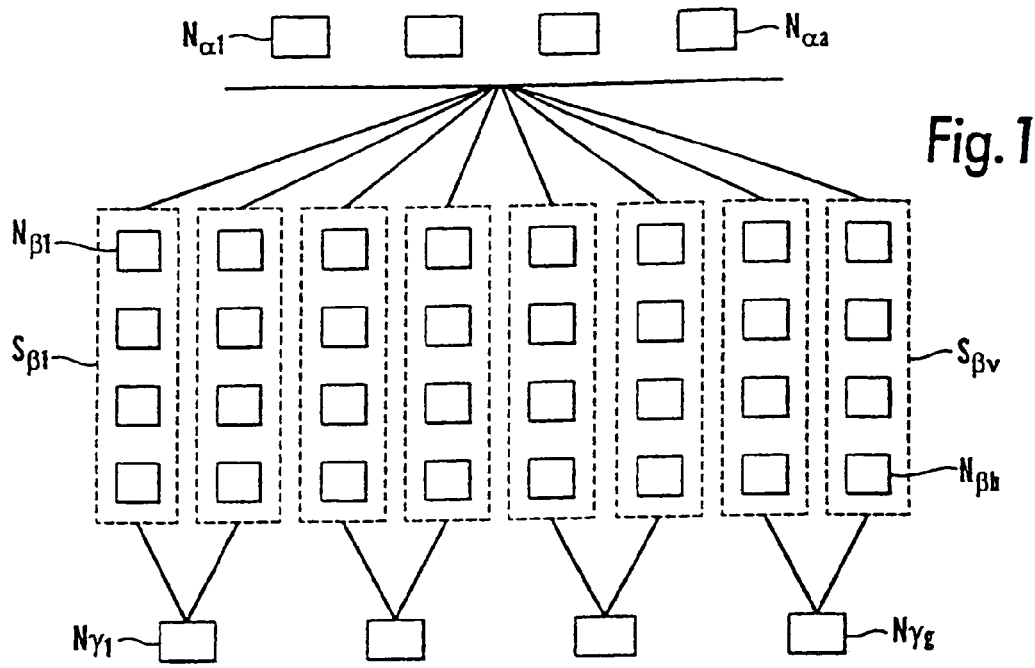
FIG. 1 shows a general overview of the architecture in a first embodiment of the search engine according to the invention, FIG. 2 a general overview of the architecture in a second embodiment of the search engine according to the invention, FIG. 3 schematically a search node with search software and dedicated hardware search chips, FIG. 4 the layout of a single module of search chips, FIG. 5 schematically the query handling in a dedicated search chip, FIG. 6 schematically the principle of performance scaling, FIG. 7 a multilevel dispatch node configuration based on a binary tree structure, FIG. 8 an overview of the architecture of a first embodiment of the search engine according to the invention, with an indication of the principle for two-dimensional scaling, and FIG. 9 an overview of the architecture of a second embodiment of the search engine according to the invention, with an indication of the principle for two-dimensional scaling.

Searching a large collection of independent documents is a highly parallel task. The search engine according to the invention employs parallelism on different levels as shall be discussed in the following.

The search engine according to the present invention searches a document collection of documents D. The documents can be divided into n partitions $d_1, d_2, \ldots, d_n$. Each document collection D, or partition d of a document collection can be preprocessed for use in a hardware text filtering system, for instance implemented by dedicated hardware like the applicant's so-called Pattern Matching Chip (PMC) which is disclosed in the applicant's international patent application No. PCT/NO99/00344 which hereby is incorporated by reference. The preprocessed document collection is denoted $D_p$ and the corresponding preprocessed document collection partitions $d_p$ are denoted $d_{p1}, d_{p2}, \ldots, d_{pn}$.

Software-based search systems require an index generated from the document collection. The index is denoted I and the indexes corresponding to the document collection partitions $d_{p1}, d_{p2}, \ldots d_{pn}$, are denoted $i_1, i_2, \ldots i_n$.

The data set needed for searching a partition d of the document collection D, is called the partition-required or partition-dependent data set. In a software only system (SW system) the data set is the index $i_k$, while in the systems with hardware (SW/HW systems), the data set also includes the preprocessed document collection partition $d_{p,k}$ with the corresponding index $i_k$, where $1 \leq k \leq n$.

The essentially software-implemented partitioning and preprocessing operations can be rendered schematically as $*(D) \rightarrow *(d_1, \ldots, d_n) \rightarrow *(d_{p1}, \ldots, d_{pn}) \rightarrow d_{pk}$, where $*(D)$ denotes a partitioning operation on the input D, $*(d_1, \ldots, d_n)$ a filtering operation, e.g. indexing, on $d_1, \ldots, d_n$ and $d_{p,k}$ of course is the partition-dependent data set, which in an SW system only shall be the index $i_k$, and with $1 \leq k \leq n$.

A search engine is implemented on a cluster of workstations that are connected using a high performance interconnect bus. The not shown workstations then constitute the server of the search system (search server). The workstations implement nodes of the search server. The nodes perform different tasks and are according to the invention implemented as set out below.

The nodes can be regarded as virtual nodes distributed among the workstations, but in a SW/HW search engine the dedicated search processing hardware must be physically present in some workstations in order to support the hardware-based search nodes. The search node software may then still be distributed. Also, some search nodes in SW/HW search engine may comprise software only, and optionally be distributed over more than one workstation.

Dispatch nodes $N_{\alpha 1}, \ldots N_{\alpha a}$ handle incoming queries and send queries along to all the search nodes. The dispatch nodes can also be configured as acquisition nodes, gathering the answers, i.e. the search results to the queries. Upon receiving the answers, the dispatch nodes in the acquisition mode merge the search results into a final result.

Search nodes $N_{\beta 1}, \ldots, N_{\beta b}$ hold a portion of the entire data set $d_p$. A search node comprises both the dedicated search software as well as a number of the above-mentioned PMC modules for hardware searching.

Indexing nodes $N_{\gamma 1}, \ldots, N_{\gamma g}$ are responsible for generating indexes for the dedicated search software on a number of search nodes. For the PMC modules, the indexing node $N_\gamma$ also filters and preprocesses the raw data.

Acquisition nodes $N_{\delta 1}, \ldots, N_{\delta e}$ may optionally be provided for gathering the answers and merging the search results into a final result, in which case the dispatch node $N_\alpha$, of course, is relieved of the acquisition task.

A first embodiment of the search engine according to the invention is shown in FIG. 1, where the search nodes $N_\beta$ are provided in columns or groups S provided and connected in parallel between the dispatch nodes $N_\alpha$ and the indexing nodes $N_\gamma$. The arrangement of the dispatch nodes $N_\alpha$ is shown schematically, but in practice they would be provided in a multilevel hierarchical arrangement.

Figure 2:
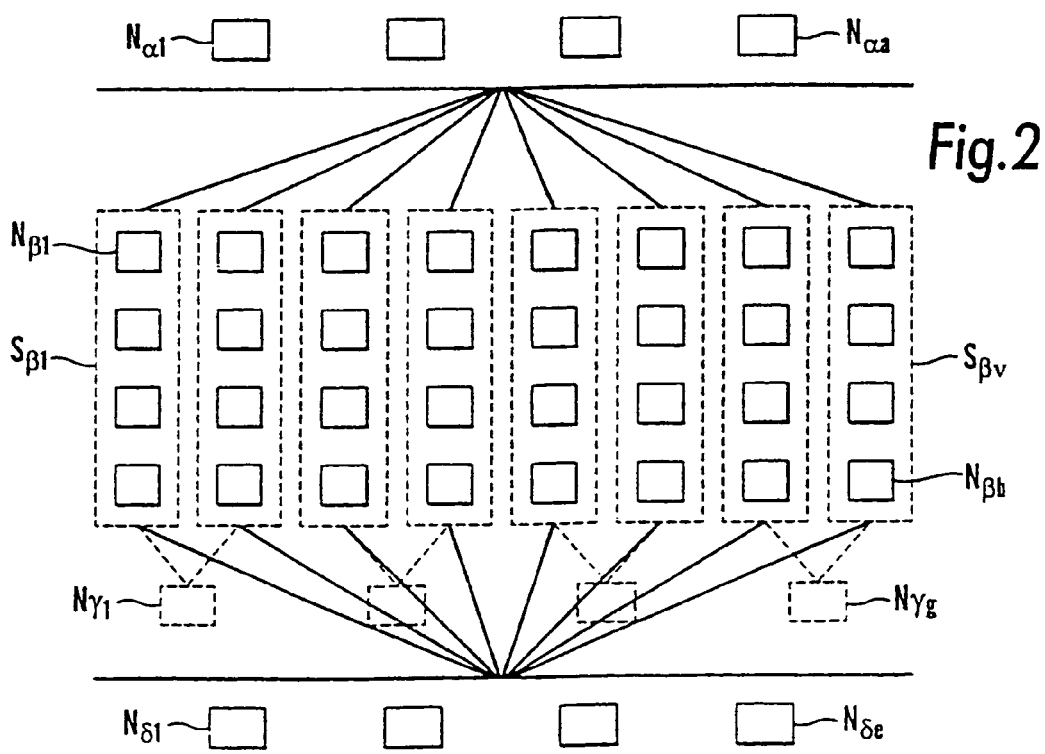

A second embodiment of the search engine according to the invention is shown in FIG. 2, where acquisition nodes $N_\delta$ are provided in a similar arrangement as that of the dispatch nodes, relieving the latter of the acquisition task.

It is to be understood that singular workstations may implement a specific type of nodes only, on alternatively more than one type of nodes. In other words, the different types of nodes may be distributed over the cluster of workstations. Hence the architecture shown in FIGS. 1 and 2 is implemented by the whole cluster, and these figures accordingly do neither show the workstations nor the interconnected bus.

The nodes shall now be discussed in more detail, starting with the search nodes which are central to the search engine according to the invention.

Figure 3:
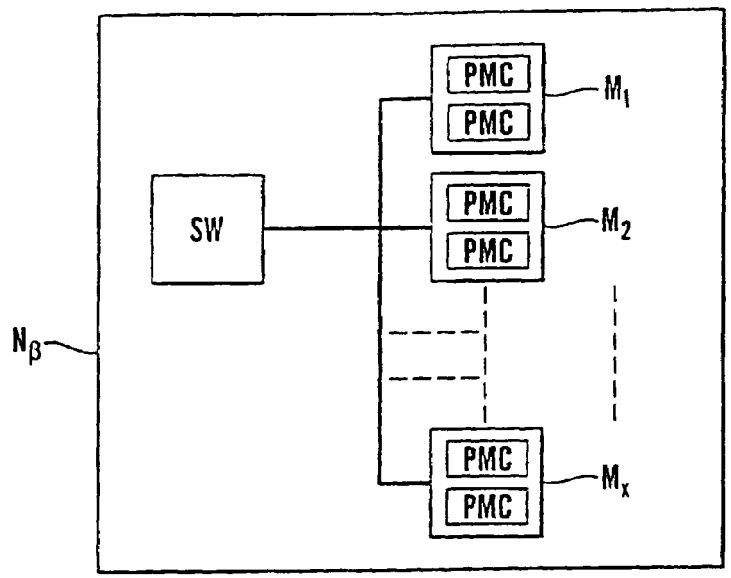

A search node $N_\beta$ holds as mentioned a portion of the entire data set $d_p$. The search node has both a software search engine SW, and optionally a number of PMC modules M, as shown in FIG. 3. The data set for a search node $N_\beta$ is generated on an indexing node $N_\gamma$, of which more anon.

A search node may be equipped with a number x of PMC modules M for very fast searching, as shown in FIG. 3. Each PMC module M has y groups G of z PMCs, as shown in FIG. 4, where each group G receives data from a single memory chip RAM. These A module M will typically be an individual circuit board. Each chip PMC is capable of processing q simultaneous queries, as shown schematically in FIG. 5.

A pattern matching chip PMC can process a data volume of $t_c$ bytes per second. Assuming that the memory modules are capable of delivering $t_y$ bytes per second to the pattern matching chips PMCs, a PMC can search through the data volume of $T_c$ bytes, $T_c = \min\{t_c, t_y\}t$, in the given time t.

As shown in FIG. 4, the pattern matching chips PMC are placed in modules M with y groups G of z chips PMC, where each group G receives data from a single memory chip RAM, and the size of the memory chip is $T_c$. The total amount of data this module can search through is $T_y = T_c$ with zq different queries.

When x modules M are provided in a search node $N_\beta$, these PMC modules M can search through an amount of data equal to $T_r = T_y \cdot x = \min\{t_c, t_y\}txy$—since no PMC modules search through the same data, the number of concurrent queries is still zq.

Thus the total query rate of the PMC modules in a search node can be expressed as $$r_{HW} \frac{zq}{\frac{T_r}{\min\{t_c, t_y\}txy}} \quad (1)$$

where $T_r$ denotes the total data volume on a node. The search node performance can now be calculated.

Given that the PMC modules N (or any hardware equivalent) has a query rate of $r_{HW}$ and that the search software on a search node $N_\beta$ has a query rate of $r_{SW}$, the total query rate $r_\Sigma$ of a search node $N_s$ can be expressed as $$r_\Sigma = r_{t,HW}(1-\phi_{SW}) + r_{t,SW}\phi_{SW} \quad (2)$$

where $\phi_{SW}$ denotes the percentage of queries q that will be executed in software. The actual value of $\phi_{SW}$ is dynamically updated at runtime from a statistical model.

The dispatch nodes $N_\alpha$ receive all the queries, and resend them to all the search nodes $N_\beta$. The answers from the different search nodes $N_\beta$ are merged and in case the dispatch nodes $N_\alpha$ functions as acquisition nodes, a complete answer is returned.

The indexing nodes $N_\gamma$ collect documents and create prebuilt indexes for the search software on the different search nodes $N_\beta$. Hence the indexing nodes $N_\gamma$ can be incorporated in the search nodes $N_\beta$ with appropriate indexing software in the latter. The hardware is based on scanning through the entire collection of raw data, but some preprocessing and filtering of the raw data can be done in the indexing nodes $N_\gamma$.

Concerning the interconnect and data traffic, some general observations can be made based on the following considerations.

Different types of interconnect can be used for connecting the nodes. For a lower end system, a regular 100 Mbit Fast Ethernet will for instance handle the traffic.

Traffic on the interconnect between the nodes can be divided into two categories:

Query traffic—traffic between dispatch nodes $N_\alpha$ and search nodes $N_\beta$. This traffic is present all the time when searching is performed. The query traffic is characterized by low to medium data volumes and high frequency.

Data traffic—traffic between indexing nodes $N_\gamma$ and search nodes $N_\beta$. The data traffic is characterized by high data volumes and low frequency (typically one batch per day).

A typical query will transfer a query string from the dispatch node $N_\alpha$ to the search nodes $N_\beta$. Then the search nodes $N_\beta$ will reply with a sequence of documents matching the query. Optionally $N_\alpha$ shall also be able to query the search node for the URL strings for the document, but this is considered immaterial in the present context.

The architecture of the search engine according to the invention can, based on the above considerations, now easily be scaled in two dimensions, viz. the data volume and the performance dimensions respectively, Data volume scaling is achieved by adding more data set partitions d, in other words more groups or columns S of search nodes $N_\beta$ are added. Also the number of indexing nodes $N_\gamma$ and dispatch nodes $N_\alpha$ can be increased as necessary in order to handle more data set partitions d.

Figure 6:
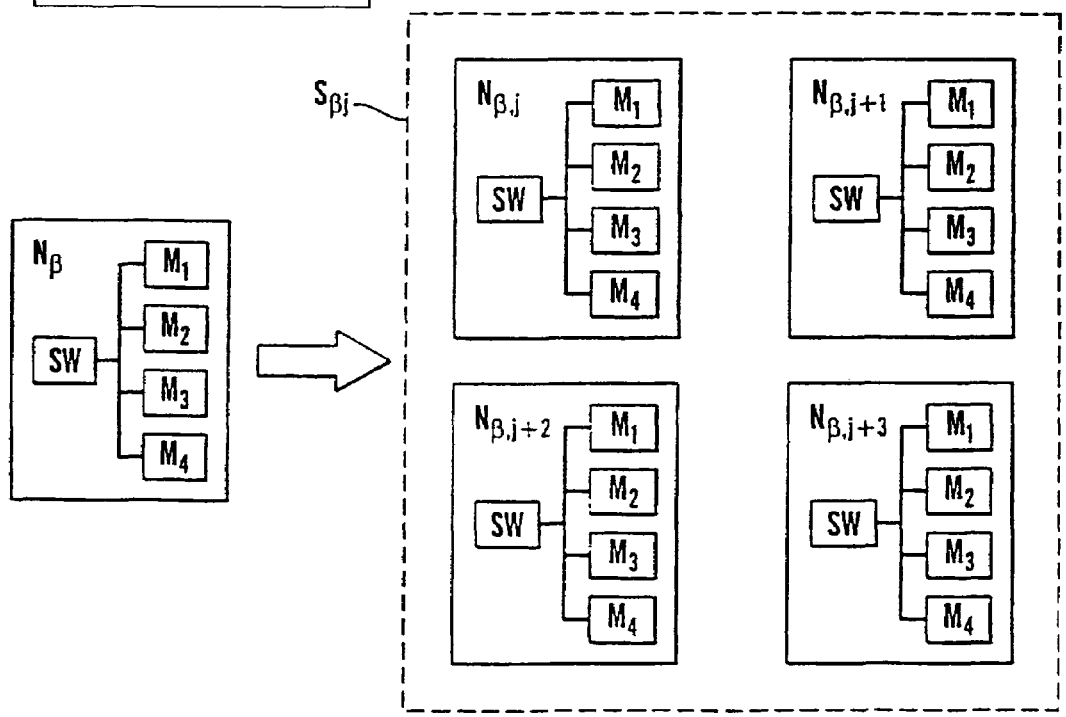

Performance scaling can be achieved in the search engine architecture by replicating data set partitions d with a corresponding increase in the number of search nodes $N_\beta$, by increasing the number as illustrated in FIG. 6. When using replication of data set partitions to scale the system performance, each search node $N_\beta$ is part of the search node group S. Thus, the search nodes $N_{\beta 1}, \ldots, N_{\beta s}$ are arranged into groups $S_{\beta 1}, \ldots, S_{\beta v}$, where $$v = \frac{s}{h_v}.$$

$h_s$ denoting the scaling factor. The group $S_{\beta j}$ contains the search nodes $N_{\beta j}, N_{\beta j+1}, N_{\beta j+2}$ and $N_{\beta j+3}$ as rendered in FIG. 8.

Figure 7:
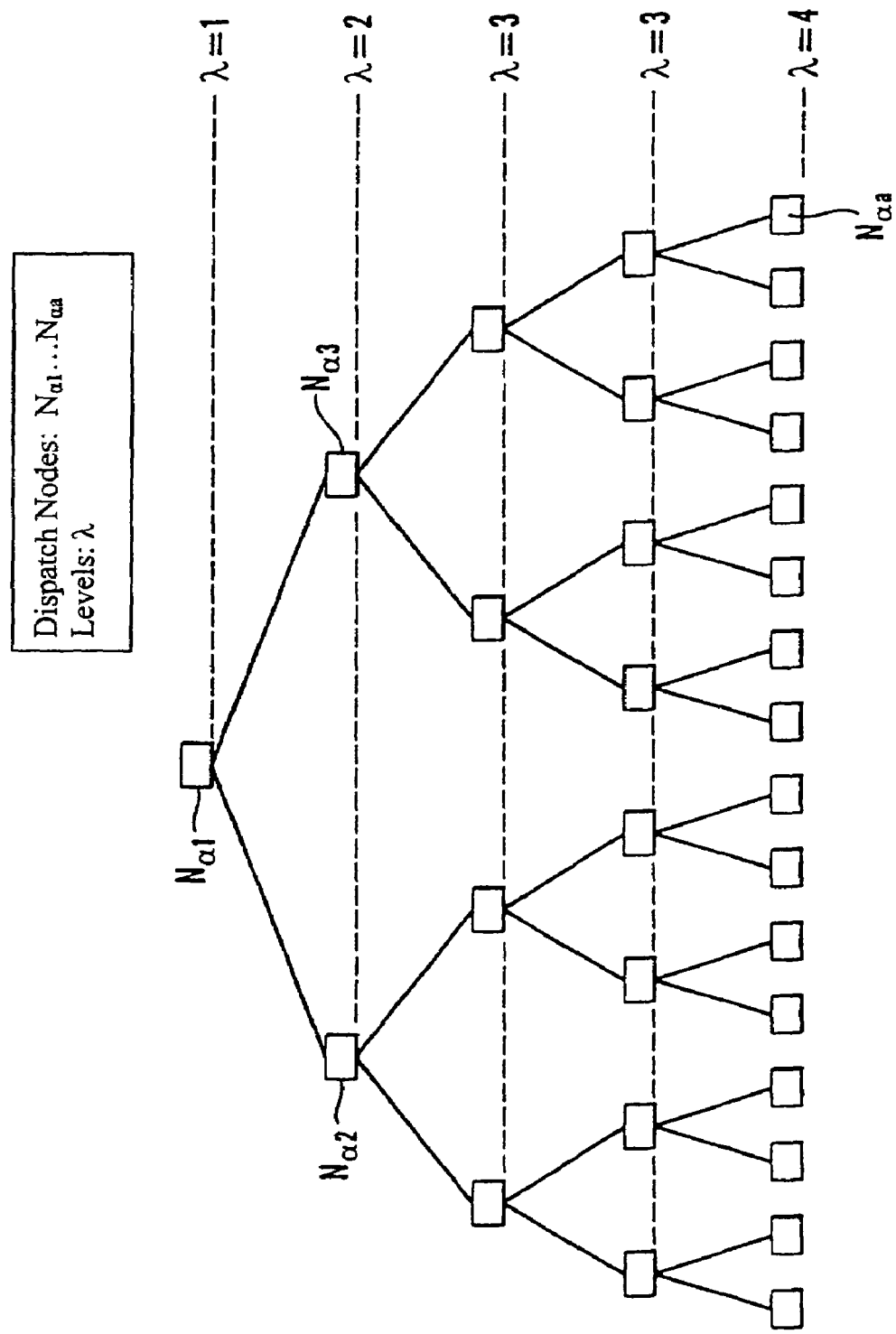

Scaling the data volume may cause the number of search nodes $N_\beta$ receiving queries broadcast from a dispatch node $N_\alpha$ growing quite large. The architecture solves this problem by using several levels λ of dispatch nodes $N_\alpha$—this is illustrated in FIG. 7, which renders the arrangement of the dispatch nodes $N_\alpha$ as nodes in a portion of a binary data distribution tree. A binary data distribution tree easily allows for a linear scalability. Similar binary data distribution trees of the kind that already has been disclosed in the applicant's above-mentioned international application PCT/NO99/00344, which discloses the configuration of an actual implementation of the pattern matching chip PMC. The number of dispatch nodes $N_\alpha$ in a regular binary tree is, of course $2^{\lambda-1}$ on each level $\lambda$, $\lambda=1,2, 3 \ldots$. A dispatch root node is on the first level, and up to and including a given level $\lambda$ there is a total of $2^{\lambda-1}$ dispatch nodes in the tree. In case the dispatch nodes $N_\alpha$ are used also as acquisition nodes, i.e. for gathering the answers returned from the search nodes, the results of a search is merged in the dispatch nodes, the root dispatch node outputting the final answer to the query. However, there is nothing against that the search engine according to the invention is set up with a separate data gathering tree connected to the search nodes and comprising acquisition nodes $N_\delta$ gathering and outputting the final result of a query on the acquisition root node of the data gathering tree, i.e. the data acquisition node tree. The acquisition node tree could then be a mirror image of the dispatch node tree.

Figure 8:
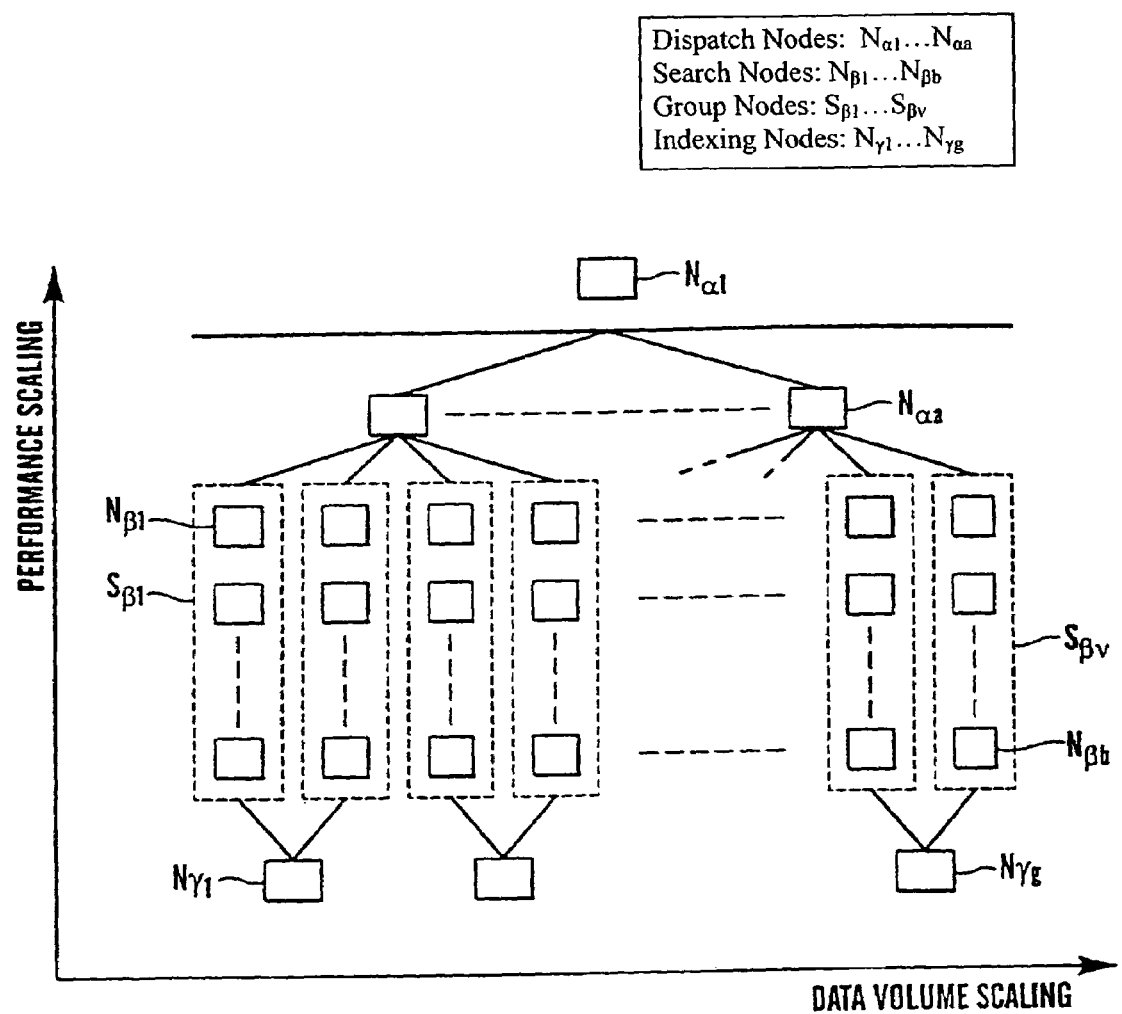
Figure 9:
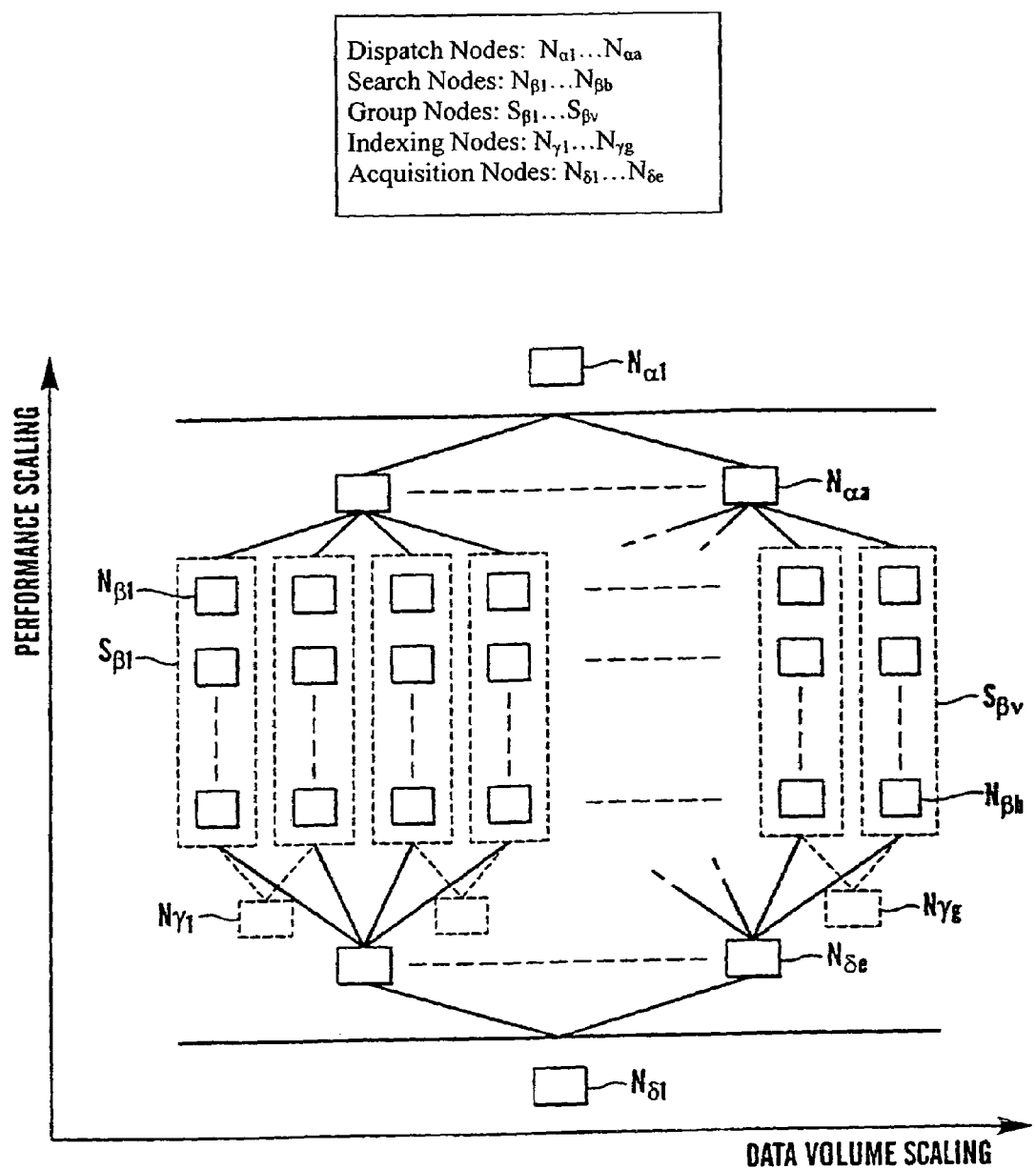

The schematic layout of a scalable search engine architecture according to the invention is shown in FIG. 8, with the principle for two-dimensional scaling illustrated. It will be seen that the dispatch nodes $N_\alpha$ constitute a front end of the search engine and route the queries to the search node $N_\beta$ and receives the search results back from the search nodes, wherein the actual search of the indexed data is performed. In case dedicated acquisition nodes $N_\delta$ are used, as shown in FIG. 9, which otherwise is similar to FIG. 8, the search results would, of course, be returned thereto. With the dispatch nodes $N_\alpha$ arranged in a tree configuration as shown in FIG. 9, the acquisition node network as a back end of the search engine would form a mirror image of the dispatch node network. The indexing (spidering) nodes $N_\gamma$ also constitute a back end of the search engine and collect data from e.g. the Internet and index the data to generate a searchable catalogue. By adding search nodes $N_\beta$ or rather search nodes groups S horizontally the search engine scales linearly in the data volume, each additional search node or search node group containing different data. Typical capacity parameters for a search engine can as a non-limiting instance be given as follows. One search node $N_\beta$ can typically handle 8 000 000 page views per day in a 5 000 000 documents catalogue. For a scalable search engine each search node $N_\beta$ typically could hold 5 000 000 unique indexed documents, implying that 40 search nodes in one row are enough to maintain a 200 000 000 documents catalogue. Scaling the performance, i.e. increasing the traffic capacity demands more rows of search nodes $N_\beta$ with the same data to be added, such that the search nodes in a single column or group S contain identical data. A group or column S of 10 search nodes $N_\beta$ hence will be able to handle 80 000 000 page views per day, with 40 columns handling a total of 3 200 000 000 page views per day.

An additional important benefit of a search engine according to the invention with the architecture scalable as herein disclosed, is that the query response time is essentially independent of the catalogue size, as each query is executed in parallel on all search nodes $N_\beta$ and that the architecture is inherently fault tolerant, such that faults in the individual nodes will not result in a system breakdown, only temporary reduce the performance until the fault is corrected.

Moreover, the in principle unlimited linear scalability of the data volume and the traffic volume which can be provided in a search engine according to the invention, contrasts sharply with prior art search engines, wherein the search cost typically increases exponentially with the data or traffic volume increase, and wherein the maximum capacity of the prior art search engines typically will be reached at low to moderate volumes. With the search engine according to the invention the cost will scale linearly with the increase in capacity at most, depending actually on whether the capacity increase is provided by adding SW search nodes only or also SW/HW search nodes. Finally the search engine according to the invention offers the advantage that each node in practice can be implemented with standard low cost commercially available PCs, but alternatively also with more expensive UNIX-based servers such as for instance the Sun or Alpha computers as currently available.

The invention claimed is:

1. A search engine for searching a collection of documents, the search engine comprising:
   at least one dispatch node, the at least one dispatch node being effective to receive and forward a search query from a user of the search engine;
   a plurality of search nodes, coupled to the dispatch node, the search nodes each being effective to receive the search query from a respective dispatch node, and to process the search query using a searching algorithm; and
   at least one indexing node, coupled to the search nodes, the at least one indexing node effective to create a respective partition-dependent data set for a respective search node; wherein
   the search nodes are logically arranged in a table and stored in a computerized memory, the table comprising a plurality of columns and a plurality of a rows, each search node in one of the rows of search nodes including a distinct partition-dependent data set so that a sum of the data sets of all the search nodes in a row yields the collection of documents, and every respective search node in one of the columns of search nodes include substantially the same partition-dependent data set.

2. The search engine as recited in claim 1, further comprising a plurality of dispatch nodes arranged in a multi-level hierarchical configuration.

3. The search engine as recited in claim 1, further comprising at least one acquisition node, distinct from the dispatch nodes, the acquisition node effective to acquire results from the search nodes for the search query.

4. The search engine as recited in claim 3, further comprising a plurality of acquisition nodes arranged in a multi-level hierarchical configuration.

5. The search engine as recited in claim 4, further comprising a plurality of dispatch nodes arranged in a multi-level hierarchical configuration.

6. The search engine as recited in claim 5, wherein the configuration of the dispatch nodes is a mirror image of the configuration of the acquisition nodes.

7. The search engine as recited in claim 1, wherein each search node includes a search software module.

8. The search engine as recited in claim 1, wherein a number of logical columns corresponds to the number of dispatch nodes.

* * * * *